(12) United States Patent
Schulz et al.

(10) Patent No.: US 12,275,048 B2
(45) Date of Patent: Apr. 15, 2025

(54) METHOD FOR PRODUCING A METAL WORKPIECE

(71) Applicants: THYSSENKRUPP HOHENLIMBURG GMBH, Hagen (DE); THYSSENKRUPP AG, Essen (DE)

(72) Inventors: Marcel Schulz, Hagen (DE); Stefan Kmetsch, Iserlohn (DE); Peter Manthey, Froendenberg (DE); Thomas Ewert, Hagen (DE)

(73) Assignees: THYSSENKRUPP HOHENLIMBURG GMBH, Hagen (DE); THYSSENKRUPP AG, Essen (DE)

( * ) Notice: Subject to any disclaimer, the term of this patent is extended or adjusted under 35 U.S.C. 154(b) by 918 days.

(21) Appl. No.: 17/287,868

(22) PCT Filed: Jan. 21, 2020

(86) PCT No.: PCT/EP2020/051354
§ 371 (c)(1),
(2) Date: Apr. 22, 2021

(87) PCT Pub. No.: WO2020/160898
PCT Pub. Date: Aug. 13, 2020

(65) Prior Publication Data
US 2021/0394244 A1 Dec. 23, 2021

(30) Foreign Application Priority Data
Feb. 7, 2019 (DE) ............ 10 2019 103 012.9

(51) Int. Cl.
| B21B 37/16 | (2006.01) |
| B21B 37/46 | (2006.01) |
| B21B 38/04 | (2006.01) |

(52) U.S. Cl.
CPC ............ *B21B 37/16* (2013.01); *B21B 37/46* (2013.01); *B21B 38/04* (2013.01)

(58) Field of Classification Search
None
See application file for complete search history.

(56) References Cited

U.S. PATENT DOCUMENTS

| 2005/0178481 A1 | 8/2005 | Rashnikov et al. |
| 2014/0129023 A1* | 5/2014 | Dagner ............... G05B 15/02 |
| | | 700/148 |

(Continued)

FOREIGN PATENT DOCUMENTS

| EP | 3216881 A1 | 9/2017 |
| EP | 3293594 A1 | 3/2018 |

(Continued)

*Primary Examiner* — Roy Y Yi
(74) *Attorney, Agent, or Firm* — PERRY + CURRIER INC.

(57) ABSTRACT

The invention relates to a method for producing a desired metal workpiece (134), the method comprising:
producing an elongate finished material (116; 222) by hot rolling, wherein a first data record (112) is assigned to the finished material (116; 222), wherein the finished material (116; 222) is logically divided in the longitudinal direction thereof into a plurality of first segments (118), wherein the first data record, for each of the first segments (118), includes first physical data (228) characterizing the segment; and
working the finished material (116; 222) using a processing process to obtain the desired metal workpiece (134), wherein the processing process is at least partially controlled based on the first physical data (228) characterizing the first segments (118) that are logically assigned to the finished material (116; 222).

19 Claims, 3 Drawing Sheets

(56) References Cited

U.S. PATENT DOCUMENTS

2014/0352504 A1* 12/2014 Shan .................... B22D 11/163
                                                                83/13
2016/0072285 A1    3/2016 Ty et al.
2017/0259313 A1    9/2017 Fairlie et al.

FOREIGN PATENT DOCUMENTS

| KR | 20050016380 A | 2/2005 |
| RU | 2494826 C1 | 10/2013 |
| WO | WO-2019012002 A1 | 1/2019 |
| WO | WO-2012034875 A2 | 3/2023 |

* cited by examiner

METHOD FOR PRODUCING A METAL WORKPIECE

The invention relates to a method for producing a metal workpiece, to a method for controlling a production apparatus of a hot rolling mill, to a device for controlling a production apparatus of a hot rolling mill, to a method for controlling a production apparatus of a processing plant, to a device for controlling a production apparatus of a processing plant, and to a computer program product.

Slabs made of different materials, such as steels, copper alloys or aluminum, are produced in continuous casting machines, for example, and subsequently further processed in a rolling mill.

Further processing is typically carried out in multiple stages, namely in a hot rolling mill on the one hand, and thereafter in a cold rolling mill. The hot rolling mill takes advantage of the method of heating the slabs to an appropriate temperature above the recrystallization temperature and reducing it in the roll gap of a hot rolling mill to a predefined thickness using pressure. Since the volume of the slab remains the same, corresponding changes in length and width occur. Due to the hot rolling process, the slab is ultimately turned into strip, which is wound on a coiler to form what is known as a coil.

In the hot rolling mill, the strip is additionally further processed in further working steps, for example by carrying out a pickling operation, an annealing operation as well as slitting of the coil, that is, longitudinal shearing, so that multiple narrow individual coils can be produced from a wide coil. This ultimately results in an end product or finished material that, after appropriate packaging, can be provided to a processing plant, such as a cold rolling mill or also a plant of an automotive supplier or, generally speaking, a metal-processing facility.

During cold rolling, the thickness of hot-rolled strip is reduced by being rolled further, for example at room temperature, and the desired processing properties are set. It is also possible to provide the cold-rolled strip with corrosion protection, for example, as part of what is known as finishing.

In the plant of an automotive supplier or, generally speaking, of a metal-processing facility, different processing steps can further process the strip, for example by way of stamping, bending, painting, milling and the like, to yield the desired metal workpiece. For example, this can be used to obtain perforated sheets for different application purposes, vehicle doors, engine hoods or, generally speaking, body parts, tool parts and much more, as the desired metal workpiece.

It is the object of the invention to provide an improved method for producing a desired metal workpiece, a corresponding system, a method for controlling a production apparatus of a hot rolling mill, a device for controlling a production apparatus of a hot rolling mill, a method for controlling a production apparatus of a processing plant, a device for controlling a production apparatus of a processing plant, and a computer program product. The objects of the invention are achieved by the features of the independent claims. Embodiments of the invention are described in the dependent claims.

A method for producing a desired metal workpiece is provided, the method comprising:
  producing an elongate finished material by hot rolling, wherein a first data record is assigned to the finished material, wherein the finished material is logically divided in the longitudinal direction thereof into a plurality of first segments, and wherein the first data record includes, for each of the first segment, first physical data characterizing the segment; and
  working the finished material using a processing process to obtain the desired metal workpiece, wherein the processing process is at least partially controlled based on the first physical data characterizing the first segments that are logically assigned to the finished material.

Embodiments of the invention could have the advantage that working the at least one portion of the finished partial using the processing process can be specifically carried out for this at least one portion of the finished material by taking into consideration the associated physical data characterizing the first segments that are logically assigned to the portion of the finished material. The processing process thus does not automatically assume that the portion of the finished material to be processed has the same physical properties in each segment, but is able to resort to digital physical first data describing the real properties of the finished material. The processing process can be accordingly adapted and controlled by very specifically addressing these real physical properties of the finished material.

In general, and without limiting the general nature, it shall be assumed hereafter in several examples that the finished material is present in a strip shape, for example, wherein the longitudinal direction refers to the main extension direction of the strip. The finished material can be supplied to the processing process in the form of a wound coil, for example, and can be unwound in the process. Insofar, this could also be referred to as a "digital coil" due to the segmentation of the strip, which is considered with respect to the working of the finished material.

Furthermore, it shall be assumed hereafter, without limiting the general nature, that, for example, the processing process encompasses a cold rolling process or is a cold rolling process. As was already mentioned above, however, the processing process can, in general, be any metal-processing process.

According to an embodiment of the invention, a set of manufacturing specifications is provided, wherein each of the manufacturing specifications includes first physical data of metal workpieces to be produced using the processing process, wherein the control of the processing process comprises:
  evaluating, by comparing the first physical data included in the first data record to the physical data included in the manufacturing specifications, which of the [metal workpieces] to be produced can be produced by working the finished material using the processing process; and
  selecting the desired metal workpiece among the producible metal workpieces for working using the processing process.

In the example of a cold rolling mill, the mill comprises a set of different manufacturing specifications which, for example, differently specify permissible thickness tolerances of finished material to be worked. It could be, in the process, that the first physical data has a wide tolerance spread, as seen across the length of the finished material, so that only manufacturing specifications for metal workpieces to be produced which are compatible with such a spread of tolerances can be considered. Accordingly, the evaluation could select those metal workpieces that are compatible therewith, based on the manufacturing specification and the first physical data included in the first data record.

The criterion based on which it is determined which of the metal workpieces to be produced "can be produced" by working the finished material using the cold rolling process, or generally speaking, the processing process, may be of a diverse nature here. The above example involves the basic compatibility, that is, a simple yes/no decision as to whether or not the first physical data is consistent with the tolerance information included in the manufacturing specification. Another possible criterion would be, for example, which of the metal workpieces to be produced can be produced most efficiently by working the finished material using the processing process. The efficiency may relate to energy efficiency, or also to efficiency in terms of minimizing the material scrap that arises during production as a result of working the finished material. The efficiency can also relate to the production speed since different first physical data certainly has influence on the maximum speed with which the finished material, or portions thereof, can be worked in the cold rolling mill.

According to one embodiment of the invention, the evaluation comprises determining the portions of the finished material of which the metal pieces to be produced can, for example, be produced most efficiently, see above, and/or with the desired tolerance and/or the desired manufacturing specifications, wherein working the finished material encompasses working the portion of the finished material which was determined with respect to the desired metal workpiece. It is thus not automatically assumed that it is always a complete coil, that is, the entire available elongate finished material, that has to be worked using the cold rolling process, or generally speaking the processing process, so as to produce a desired metal workpiece, but additionally also an evaluation is carried to the effect as to whether certain portions of the finished material, due to the specific suitability or compatibility thereof, are perhaps supplied to the processing process for producing the desired metal workpiece, or also are excluded therefrom.

According to one embodiment of the invention, the control of the processing process comprises specifically establishing physical bending parameters and/or stamping parameters and/or rolling parameters based on the first data record so as to obtain the desired metal workpiece, wherein, for example, the specific establishment of the physical bending parameters and/or stamping parameters and/or rolling parameters is carried out based on the first physical data of those first segments which are logically assigned to the portion of the finished material to be worked. The physical parameters include, for example, the rolling speed and/or a rolling thickness and/or an intermediate annealing temperature and/or temper rolling parameters. Additional parameters are a stamping speed, stamping force, the number of individual bending operations to achieve final bending, temperatures used during stamping or bending, including annealing temperatures, and the like.

As a result, the processing process could be controlled in a segment-specific manner for individually working the particular segments, so that ultimately a desired metal workpiece having a very high quality could result. For example, the strength of steel changes during cold rolling to a relatively large degree as a function of the rolling process, so that here intermediate annealing may be needed to ultimately ensure the desired mechanical properties. Since however, depending on the segment composition, the material thickness can be different, and thus the attendant mechanical rolling operation will also differently impact the mechanical properties, an individual adaptation of the intermediate annealing temperature to the mechanical working that was carried out earlier, which in turn is controlled as a function of the first physical rates (for example the thickness), [could take place] so that overall a mechanical composition having greater uniformity could be ensured across the entire strip length, for example.

According to one embodiment of the invention, working the finished material includes collecting second physical data of those first segments which are logically assigned to the finished material to be worked, wherein the first physical data is checked for plausibility using the second physical data, and, based on the plausibility check, measuring systems are optimized, by which the first and/or second physical data was collected, or wherein, based on the plausibility check, the working of further finished material to be produced by hot rolling is adapted or halted.

If, for example, the collection quality of the measuring systems based on which the first and second physical data was collected differs, the measuring system having a lower collection quality could be optimized using the measurement results of the measuring system having the higher collection quality. In this way, for example, outliers in measurements could be detected more easily, and the measurement results obtained by the measuring system having the lower quality could be accordingly smoothed. It is furthermore possible, for example, to optimize the measurement results of the measurement system having the lower quality by way of machine learning algorithms, wherein the machine learning algorithms or the machine learning model could be trained in a very simple manner by way of the physical data provided by both measuring systems. In this way, the measuring system having the lower collection quality could also be used with high reliability, for example to control processes of the hot rolling mill or processing plant, in particular of the cold rolling mill, even if no plausibility check is presently taking place using other physical data of the other measuring system.

As was already mentioned, it is also possible, based on the plausibility check, to adapt or halt the working process of further finished material to be produced by hot rolling. If it is established, for example, that thickness information of the finished material, as it is indicated in the first physical data, does not agree with the corresponding thickness measurement of the second physical data, this could be an indication that a problem exists in a material working operation downstream from the last thickness determination in the hot rolling mill, which results in an unexpected thickness reduction of the finished material. During a pickling process, for example, only a predetermined small thickness reduction of the hot-rolled strip will occur in the hot rolling mill, wherein, in the event that this thickness reduction exceeds the values to be expected, a production problem could presumably exist in the pickling operation. As a result of the plausibility check, it is thus possible to prevent potentially arising scrap during the production of further finished material to be produced. The apparatus of the hot rolling mill can thereupon be accordingly optimized and adapted.

According to one embodiment of the invention, the method furthermore includes comparing the real weight of the finished material to a theoretical weight, wherein the theoretical weight is calculated from the first physical data. In the event that the real weight deviates from the theoretical weight by more than a predefined tolerance value, a signal is output via a user interface. In this way, it could be checked either on the side of the hot rolling mill at the outgoing goods stage, for example when packaging the produced finished material, or at the incoming goods stage of the processing plant, that is, when the finished material is received, whether or not the finished material is actually present in the desired quantity. Using the continuous width and thickness of the material, specified across the length of the finished material via the segments, for example, it is possible to calculate what a corresponding shipping weight, that is, final weight of the finished material, should be in relation to the total length of the finished material. If the aforementioned deviation is found here, which exceeds the predefined tolerance value, this could be an indication, for example, of faulty measuring systems during the determination the first or second physical data or of errors that are present during the conversion of measurement values to the first or second physical data.

A user interface can be a human-to-machine (H2M) interface between a terminal or software module and the person, wherein the transmitted signals (events) are further processed manually. These include digital and analog display devices, graphical user interfaces, voice user interfaces, the use of applications to display and play back the signal on mobile telecommunication devices, and the like. It is also possible for a user interface to be a machine-to-machine (M2M) interface for communication between two terminals or software modules. Here, the transmitted signals (events) are processed fully automatically according to predefined logic.

According to one embodiment of the invention, the production of the finished material by hot rolling is carried out by multiple processing steps using consecutive manufacturing units, wherein processing by the manufacturing units in each case results in an elongate intermediate product, for example in strip form, wherein processing by the last of the manufacturing units results in the finished material as the intermediate product.

For example, a second data record is assigned to a given intermediate product of the intermediate products, wherein the given intermediate product, in the longitudinal direction thereof, is likewise logically divided into a plurality of second segments, wherein the second data record for each of the second segments includes third physical data characterizing the segment, wherein processing the given intermediate product to yield the finished material influences the physical data of the intermediate product in a previously known manner, wherein the first physical data is calculated from the third physical data, and the calculation takes the previously known influence into consideration.

The previously known influence encompasses, for example, a mechanical and/or geometric influence.

This could have the advantage that it is not necessary to provide several corresponding measuring systems to control or monitor or document the hot rolling process for each of the manufacturing units and, additionally, in the end to have the required first physical data available. If a processing operation of the given intermediate product to yield the finished material influences the physical properties of the intermediate product in the previously known manner, it is sufficient, on the one hand, to control the processing unit in charge of processing based on this physical data and, on the other hand, to theoretically calculate, from the third physical data, the first physical data which will result from processing the given intermediate product by having prior knowledge of the previously known influence.

A number of reasons may exist as to why a measurement or determination of portions of the first physical data should not be carried out, and instead the first physical data is at least partially calculated from third physical data. One example here is the slitting of the coil so that, in the simplest case, two individual coils having a respective lesser width result from a single coil having a given width. Since the slitting process works the coil in a predefined manner, it could be sufficient, for example, to add the width of the coil in a segment-specific manner as third physical data prior to slitting the coil, so that the corresponding segment-specific coil width (strip width) can be calculated therefrom for each coil that results after slitting as part of the first physical data; as a result, it is not necessary to carry out two measuring processes for determining the width, but only a single upstream measuring process is necessary for the width.

According to one embodiment of the invention, the geometry of the finished material differs from the geometry of the given intermediate product, wherein the previously known influence encompasses the difference in geometry, wherein the calculation of the first physical data from the third physical data takes an assignment of the second segments, which results from the difference in geometry, to the first segments into consideration. For example, the difference in geometry could result from the given intermediate product being stretched as a result of a rolling operation so that originally two segments having a length of 10 cm (as seen in the longitudinal direction of the finished material), for example, turn into stretched first segments having a length of 30 cm after the rolling operation. So as to still convert the third physical data to the first physical data, the stretching of the second segments, which results from the difference in geometry, to yield the first segments, and thus the corresponding logical positioning of the first segments on the produced finished material, must be taken into consideration.

According to one embodiment of the invention, the method comprises checking the first physical data for plausibility using the third physical data and the difference in geometry, wherein, in the event that a plausibility check is not possible, a signal is again output via a user interface. This can, in turn, be carried out in the hot rolling mill. If, for example, third physical data is known, which indicates a segment-specific thickness of the intermediate product, and a downstream manufacturing step ensures that the thickness is reduced in a predefined manner, and thus the length is accordingly increased, as a result of the rolling operation, it is possible to use length information with respect to the produced finished material, which was measured in the downstream manufacturing step, as first physical data for carrying out a plausibility check using the third physical data with respect to the thickness.

According to one embodiment of the invention, a given intermediate product of the intermediate products is processed using operating parameters of the manufacturing unit which carries out the processing, wherein the processing of the given intermediate product results in the intermediate product being worked, in a manner that is assignable to the first segments, using the respective operating parameters, wherein the first physical data encompasses the operating parameters that are used during the respective processing operation, specifically for the first segments.

For example, the operating parameters encompass a force, acting on the respective processed intermediate product during processing, and/or a temperature and/or a processing speed and/or a convexity of a roll used during processing by the manufacturing unit.

Having specific knowledge of the operating parameters of the corresponding manufacturing unit which are used when processing the intermediate product could likewise make it possible to carry out the subsequent processing of the finished material in a segment-specific manner, optimized by the processing plant, such as the cold rolling mill. For example, an operating parameter could influence the mechanical strength properties of the finished material in a segment-specific manner, for example the toughness, the expandability, the elastic properties and the like. The segment-specific operating parameters could be used so as to now homogeneously set the desired mechanical properties of the desired metal workpiece for all segments in the processing plant. This means, for example, that not only specific measurement results, for example in the form of geometric data characterizing the segments, can be used to control the processing process, but also operating parameters, from which, in turn, certain physical properties can be determined in a segment-specific manner for the finished material.

According to one embodiment of the invention, the first, second and/or third physical data, based on a given segment, includes at least one of the following: an absolute value and/or a mean value and/or a minimum and/or a maximum and/or a standard deviation.

For example, the first, second and/or third physical data, based on a given segment, describes at least one of the following properties of the segment: mechanical properties and/or geometric properties.

In another aspect, the invention relates to a system for producing a desired metal workpiece, the system being designed to:
  produce an elongate finished material by hot rolling, wherein a first data record is assigned to the finished material, wherein the finished material is logically divided in the longitudinal direction thereof into a plurality of first segments, and wherein the first data record, for each of the first segments, includes first physical data characterizing the segment; and
  work the finished material using a processing process to obtain the desired metal workpiece, wherein the processing process is at least partially controlled based on the first physical data characterizing the first segments that are logically assigned to the finished material.

In another aspect, the invention relates to a method for controlling a production apparatus of a rolling mill, the method through the production apparatus of the hot rolling mill comprising:
  producing an elongate finished material by hot rolling, wherein a first data record is assigned to the finished material, wherein the finished material is logically divided in the longitudinal direction thereof into a plurality of first segments, and wherein the first data record, for each of the first segments, includes first physical data characterizing the segment; and
  transmitting the first data record to a production apparatus of a processing plant for controlling the working of the finished material using a processing process based on the first physical data.

In another aspect, the invention relates to a device for controlling a production apparatus of a rolling mill, wherein the device comprises a processor and a memory including program instructions, the execution of the program instructions controlling the production apparatus of the hot rolling mill for:
  producing an elongate finished material by hot rolling, wherein a first data record is assigned to the finished material, wherein the finished material is logically divided in the longitudinal direction thereof into a plurality of first segments, and wherein the first data record, for each of the first segments, includes first physical data characterizing the segment; and
  transmitting the first data record to a production apparatus of a processing plant for controlling the working of the finished material using a processing process based on the first physical data.

In another aspect, the invention relates to a method for controlling a production apparatus of a hot rolling mill, the method through the production apparatus of the hot rolling mill comprising:
  receiving a first data record, wherein the first data record is assigned to the finished material, wherein the finished material is logically divided in the longitudinal direction thereof into a plurality of first segments, and wherein the first data record, for each of the first segments, includes first physical data characterizing the segment; and
  working the finished material using a processing process so as to obtain the desired metal workpiece, wherein the processing process is at least partially [controlled] based on the first physical data characterizing the first segments that are logically assigned to the finished material.

In another aspect, the invention relates to a device for controlling a production apparatus of a processing plant, in particular of a cold rolling mill, wherein the device comprises a processor and a memory including program instructions, the execution of the program instructions controlling the production apparatus of the processing plant for:
  receiving a first data record, wherein the first data record is assigned to the finished material, wherein the finished material is logically divided in the longitudinal direction thereof into a plurality of first segments, and wherein the first data record, for each of the first segments, includes first physical data characterizing the segment; and
  working the finished material using a processing process so as to obtain the desired metal workpiece, wherein the processing process is at least partially [controlled] based on the first physical data characterizing the first segments that are logically assigned to the finished material.

In another aspect, the invention relates to a device for controlling a production apparatus of a processing plant, wherein the device comprises a processor and a memory including program instructions, the execution of the program instructions controlling the production apparatus of the processing plant for:
  receiving a first data record, wherein the first data record is assigned to the finished material, wherein the finished material is logically divided in the longitudinal direction thereof into a plurality of first segments, and wherein the first data record, for each of the first segments, includes first physical data characterizing the segment; and
  working the finished material using a processing process so as to obtain the desired metal workpiece, wherein the processing process is at least partially [controlled] based on the first physical data characterizing the first segments that are logically assigned to the finished material.

In another embodiment, the invention comprises a computer program product [including] instructions executable by a processor for carrying out the method.

The above-described embodiments can be arbitrarily combined with one another, unless these combinations mutually exclude one another.

A person skilled in the art will understand that aspects of the present invention can be implemented in the form of a device, a method or a computer program product. Accordingly, aspects of the present invention can take on the form of a pure hardware embodiment, a pure software embodiment (including firmware, software present in the memory, micro code and the like), or an embodiment combining software and hardware aspects, which herein can all be referred to in general as "circuit," "module" or "system." Furthermore, aspects of the present invention can take on the form of a computer program product, which is supported by one computer-readable medium, or by several computer-readable media in the form of computer-executable code.

It is possible to use an arbitrary combination of one or more computer-readable media. The computer-readable medium can be a computer-readable signal medium or a computer-readable memory medium. A "computer-readable memory medium," as used herein, encompasses a material memory medium that is able to store instructions, which can be executed by a processor of a computer device. The computer-readable memory medium can be referred to as a computer-readable non-volatile memory medium. The computer-readable memory medium can also be referred to as a tangible computer-readable medium. In some embodiments, a computer-readable memory medium may also be able to store data that makes it possible for the data to be accessed by the processor of the computer device. Examples of computer-readable memory media include, but are not limited to: a diskette, a magnetic hard drive, a solid state drive, a flash memory, a USB stick, random access memory (RAM), read-only memory (ROM), an optical disk, a magneto-optical disk, and the register file of the processor. Examples of optical disks include compact disks (CD) and digital versatile disks (DVD), for example CD-ROM, CD-RW, CD-R, DVD-ROM, DVD-RW or DVD-R disks. The term "computer-readable memory medium" also refers to different types of recording media that are suitable for being retrieved by the computer device via a network or a communication link. For example, data can be retrieved via a modem, via the Internet or via a local network. Computer-executable code, which is executed on a computer-readable medium, can be transmitted via any suitable medium, including, without being limited to, wireless or wired light wave guides, RF, and the like, or any suitable combination of the above media.

A computer-readable signal medium can include a propagated data signal, which contains the computer-readable program code, for example in a baseband or as part of a carrier signal (carrier wave). Such a propagation signal may take on any form, including, without being limited thereto, an electromagnetic form, an optical form or any suitable combination thereof. A computer-readable signal medium may be any computer-readable medium that is not a computer-readable memory medium and that a program is able to transmit, disseminate or transport for use by or in connection with a system, a unit or a device for executing instructions.

"Computer memory" or "memory" is an example of a computer-readable memory medium. A computer memory is any memory directly accessible to a processor.

"Computer data memory" or "data memory" is another example of a computer-readable memory medium. Computer data memory is any non-volatile computer-readable memory medium. In some embodiments, a computer memory can also be a computer data memory or vice versa.

A "processor," as used herein, encompasses an electronic component that is able to execute a program-executable or machine-executable instruction or computer-executable code. A reference to the computer device comprising a "processor" shall be interpreted so as to possibly encompass more than one processor or processing cores. The processor can, for example, be a multi-core processor. A processor may also refer to a collection of processors within a single computer system or be distributed among multiple computer systems. The term "computer device" or "computer" shall also be interpreted so as to possibly indicate a collection or a network of computer devices or computers, which each comprise one processor or processors. The computer-executable code can be executed by multiple processors, which can be distributed inside the same computer device or even across multiple computers.

Computer-executable code can encompass machine-executable instructions or a program that prompts a processor to carry out an aspect of the present invention. Computer-executable code for executing operations for aspects of the present invention can be written in any combination of one or more programming languages, including an object-oriented programming language such as Java, Smalltalk, C++ or the like, and conventional process-oriented programming languages such as the programming language "C" or similar programming languages, and be translated into machine-executable instructions. In some instances, the computer-executable code can be present in the form of a higher programming language or in a pre-translated form and be used in connection with an interpreter generating the machine-executable instructions.

The computer-executable code can be executed completely on the computer of a user, partially on the computer of the user, as an independent software package, partially on the computer of the user and partially on a remotely situated computer, or completely on the remotely situated computer or server. In the latter case, the remotely situated computer may be connected to the computer of the user by any kind of network, including a local area network (LAN) or a wide area network (WAN), or the connection can be established by way of an external computer (for example via the Internet, using an Internet service provider).

Aspects of the present invention will be described with reference to flow chart representations and/or block diagrams of methods, devices (systems) and computer program products according to embodiments of the invention. It shall be pointed out that each block, or portions of blocks, of the flow charts, representations and/or block diagrams can be executed by computer program instructions, if necessary in the form of computer-executable code. It shall furthermore be pointed out that combinations of blocks in different flow charts, representations and/or block diagrams can be combined, unless they mutually exclude one another. These computer program instructions can be provided to a processor of a general-purpose computer, a special-purpose computer or another programmable data processing device, to create a device, so that the instructions executed by way of the processor of the computer or the other programmable data processing device generate means for executing the functions/steps established in the block, or the blocks, of the flow charts and/or of the block diagrams.

These computer program instructions can also be stored on a computer-readable medium, which can control a computer or other programmable data processing devices or other devices so as to function in a certain manner, so that the instructions stored on the computer-readable medium generate a production product, including instructions that implement the function/step established in the block, or the blocks, of the flow charts and/or of the block diagrams.

The computer program instructions can also be stored on a computer, other programmable data processing devices or other devices to prompt the execution of a series of process steps on the computer, other programmable data processing devices or other devices so as to generate a process that is executed on a computer, so that the instructions executed on the computer or the other programmable devices generate methods for implementing the functions/steps established in the block, or the blocks, of the flow charts and/or the block diagrams.

Embodiments of the invention will be described hereafter in greater detail based on the drawings. In the drawings.

Hereafter, similar elements are, inter alia, denoted by identical reference numerals.

Figure 1:
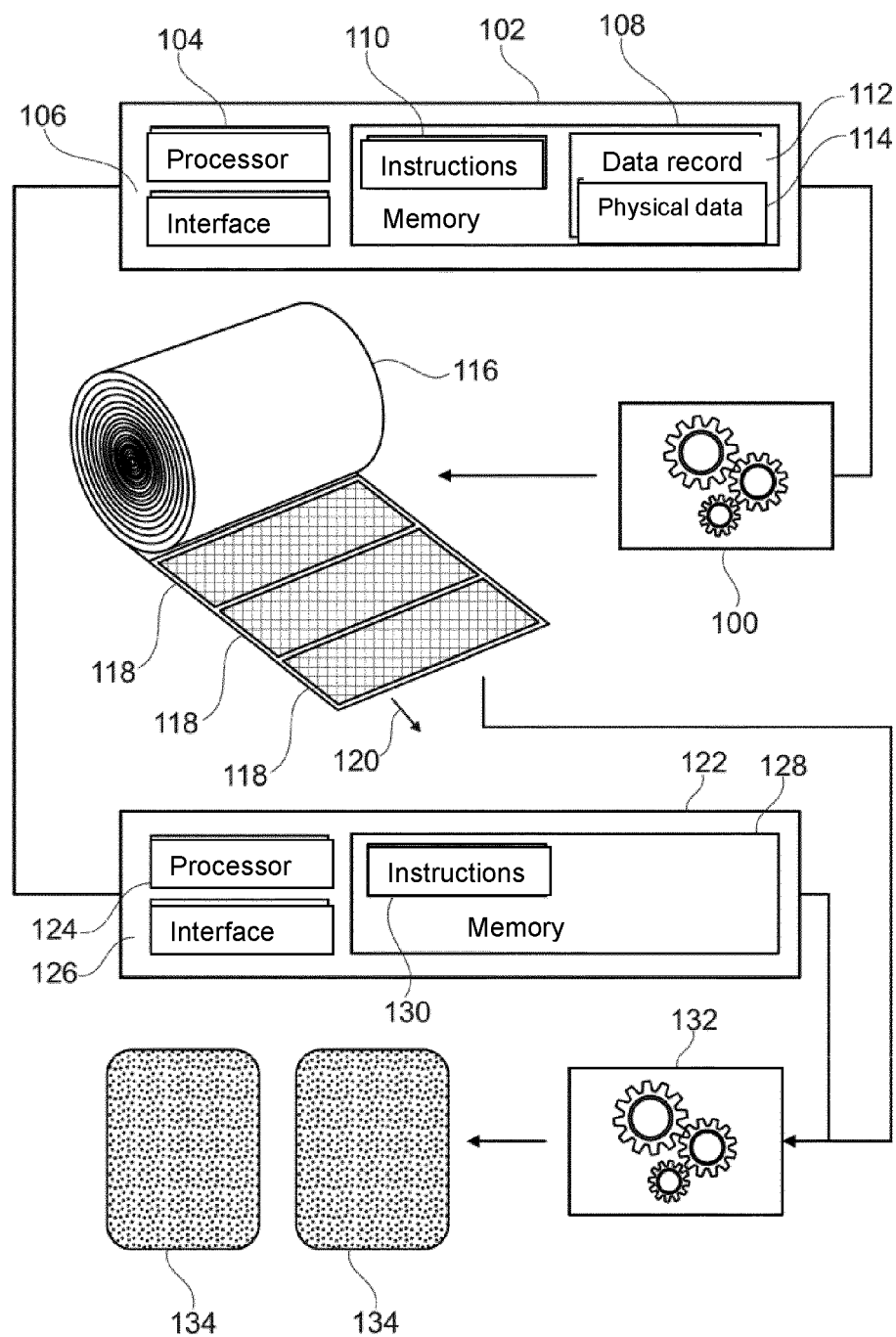
FIG. 1 shows a block diagram of a system for producing a desired metal workpiece.

FIG. 1 shows a block diagram of a system comprising a module 102 for controlling a hot rolling mill 100 and a module 122 for controlling a processing plant 132. The modules 102 and 122 each comprise a processor 104 and 124, a communication interface 106 and 126, and a memory 108 and 128 including corresponding program instructions 110 and 130. It shall be assumed hereafter that the processing plant, by way of example, is a cold rolling mill.

A finished material 116 is produced by the hot rolling mill 100. It shall be assumed hereafter, without limiting the general nature, that the elongate finished material is a metal strip, which can be rolled to yield a coil. However, it shall be pointed out that, in general, the finished material can be a strip, a thick plate, profiles, rod elements and the like.

A coil 116 is thus produced, for example, which is logically divided in the longitudinal direction 120 of the strip, which is wound to yield a coil 116, into different segments 118. Physical data 114 with respect to each segment 118 is stored in the memory 108. The physical data, collectively, forms part of a data record 112, which is stored in the memory 108. The physical data can, for example, be a segment width, a segment length, a segment thickness, a thickness profile of the segment as a function of the length and width, and the like, specifically for each of the segments.

In the example of FIG. 1, the module 102 is able to control the hot rolling mill 100 for producing the coil 116. However, it is also possible that a corresponding control unit for controlling the hot rolling mill 100 is provided separately from the module 102, and the module 102 is only provided for storing or collecting the physical data 114 and, for example, for transmitting the data from the interface 106 to the interface 126 of the module 122.

The coil 116 can be further processed in the cold rolling mill 132 so as to produce therefrom one or more desired metal workpieces 134, for example thin sheet elements 134. Without limiting the general nature, it shall be assumed here that the desired metal piece produced by cold rolling is a cold-rolled thin sheet. The desired metal workpiece to be produced can, in general, be a thin sheet, ultrathin sheet, strips, and also profiles having a wide variety of geometries.

The cold rolling process (or processing process in general) is at least partially controlled by the module 122 based on the physical data 114 characterizing the segments 118 that are logically assigned to the finished material 116, that is, the coil. The instructions 130 thus ensure that the working operation of the coil 116 by way of the cold rolling process is influenced at least based on the physical data 114.

Figure 2:
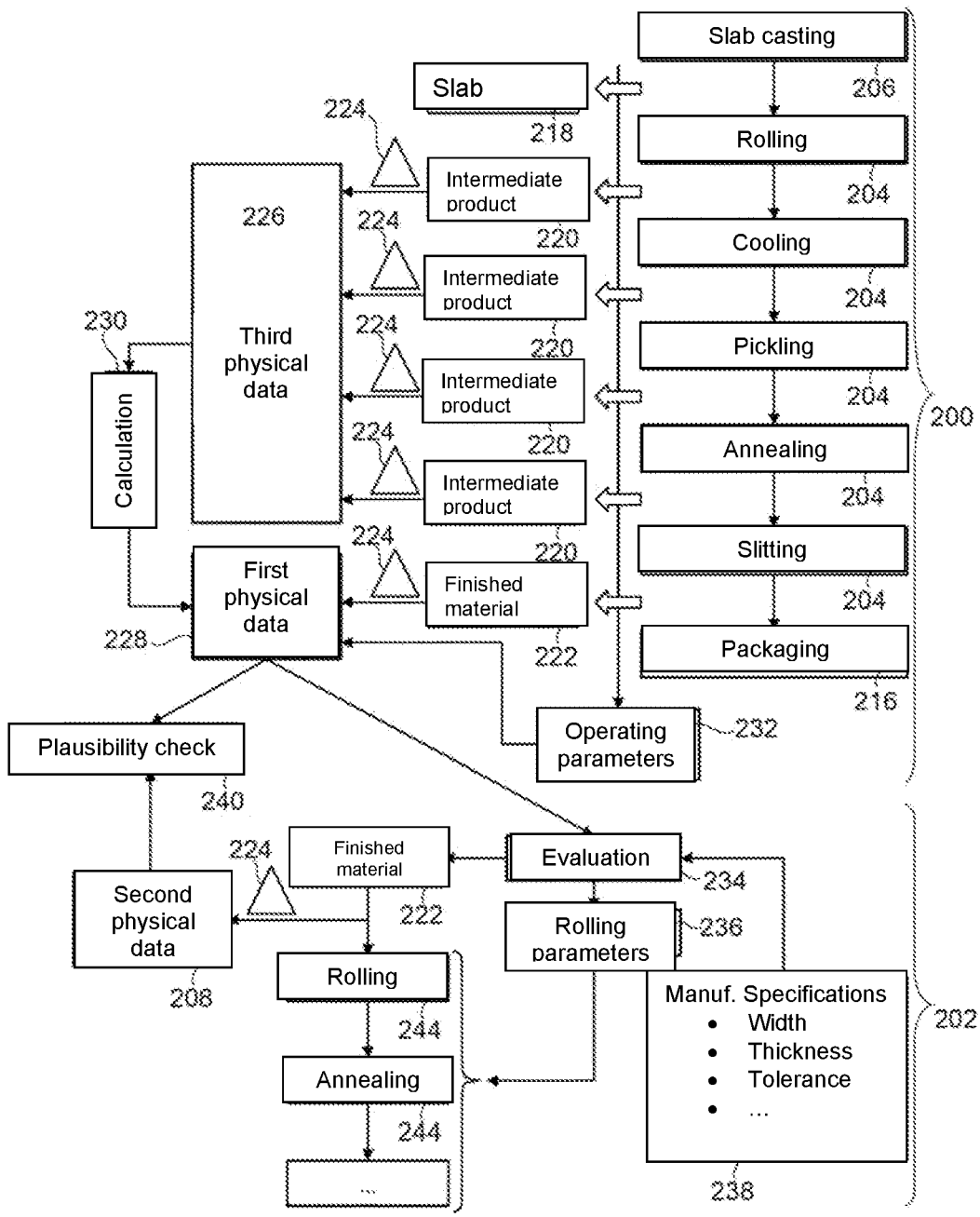
FIG. 2 shows a block diagram of a system for producing a desired metal workpiece.

FIG. 2 shows a block diagram comprising a production apparatus 200 of a hot rolling mill and a production apparatus 202 of a cold rolling mill. The production apparatus of the hot rolling mill comprises different manufacturing units 204, also referred to as stations. Not part of the production apparatus is a continuous casting machine, for example, which carries out the casting of the slabs. Nonetheless, the continuous casting machine is denoted by reference numeral 206 in the block diagram of FIG. 2 for the sake of completeness, since the slab 218 resulting from the casting operation is usually the starting point for the subsequent working steps. The produced slab 218 can, for example, be rolled to a strip in a hot rolling operation in a corresponding station 204, wherein a hot rolled strip results here as the intermediate product 220. Downstream from this is the manufacturing unit 204 "Cooling," wherein after cooling a cooled strip results, which after being wound on a coiler becomes an intermediate product 220 "Coil." This intermediate product can also be further processed, for example by being pickled after the strip has been unwound from the coil by the manufacturing unit 204 "Pickling" and is then coiled again, wherein a pickled coil results from this as the intermediate product 220.

Downstream from this is the manufacturing unit "Annealing" 204, wherein an annealed coil results from this as the intermediate product 220. The last step is slitting by the manufacturing unit "Slitting" 204, this finally resulting in a slit coil as the end product. This is wound strip and thus, for example, the above-described elongate finished material 222. This finished material 222 can be packaged in a packaging step 216 "Packaging" by a corresponding packaging unit and thereupon be provided to the cold rolling mill.

It shall be noted that the sequence of the processing steps of the intermediate product to yield the end product can certainly vary and must not be regarded as fixedly defined within the scope of the present description. For example, annealing can certainly take place prior to pickling. Individual manufacturing steps, such as annealing or the longitudinal slitting, are not absolutely necessary and may also be completely dispensed with, depending on the customer's specification.

A sensor 224 is provided in the area of the hot rolling mill 200, which collects first physical data 228 of the finished material 222. The first physical data is, as described above, collected in a segment-specific manner, stored in the form of a first data record and assigned to the finished material 222. Since the finished material 222 is a coil, the "supplementation" of the coil with the first physical data is also referred to as a "digital coil" which almost completely physically characterizes the coil. Operating parameters 232 can likewise be part of the first physical data 228, which the individual manufacturing units 204 used to produce the corresponding intermediate data and also the finished material. Operating parameters 232 can encompass forces, temperatures, processing speeds, and the like used during processing. These operating parameters 232 can also be included in a segment-specific manner as first physical data 228 in the corresponding data record. It is also possible for the operating parameters 232 and/or the values collected by the sensors 224 to be further processed and, after further processing, to be stored as the first physical data 228.

Another option is to analyze the individual intermediate products 220 by way of appropriate sensors 224 and to subject the corresponding result of the analysis, in the form of so-called third physical data 226, to a calculation 230. In the process, the calculation 230, for example, forecasts as to how the first physical data 228, after further processing of the respective intermediate product 220 to yield the finished material, will result from the third physical data. The calculation 230 is optional and can be used, for example, when the intermediate product is changed in a precisely defined manner, due to one or more subsequent processing steps 204, so that it is sufficient to collect the corresponding physical data once and to then extrapolate the data with respect to the further processing steps, or to predict the development of the corresponding physical data. The third physical data can also be adopted unchanged as first physical data if it does not have to be assumed that the physical data changes in any way as a result of the intermediate product being further processed to yield the finished material.

An evaluation module 234 is provided on the part of the cold rolling mill 202, which can be implemented, for example in the form of instructions 130, in the module 122 (see FIG. 1). If the coil produced as the finished material 222 by the hot rolling mill now undergoes further processing in the cold rolling mill, the different further processing steps can be controlled based on the physical data 228 by generating or adapting corresponding physical rolling parameters 236 therefrom. This as well can again take place in a segment-specific manner, wherein the rolling parameters 236 can encompass a speed of a rolling operation or an annealing temperature of an annealing operation, for example, which result from consecutively arranged stations 244 "Rolling" and "Annealing."

A person skilled in the art understands that rolling by means of the station 244 is an exemplary operation in the cold rolling mill during which, for example, the pickled strip, in the form of continuous strip, is further worked in terms of the geometric shape thereof, for example to ensure a high degree of deformation with tight tolerances and good surface quality. The material hardened during cold rolling can be subjected to recrystallization annealing so as to restore the forming properties for further processing. Further steps, which are not discussed in greater detail hereafter, are temper rolling, for example, whereby a yield point is eliminated and the sheet surface is smoothed or deliberately roughened and compacted, as well as finishing, during which the material can be inspected for surface defects, for example, in recoiling apparatuses and provided with an anti-corrosive coating. Here, longitudinal shearing and cutting to the appropriate desired geometric shapes is likewise possible. All of this can be implemented by appropriate stations 244.

For example, the evaluation module 234 can access a database 238 comprising different manufacturing specifications for different metal workpieces to be produced. The manufacturing specifications include a desired width, a desired thickness, corresponding tolerance specifications, material specifications, and the like, for example, for each metal workpiece to be produced, for example for each thin sheet to be produced. Depending on the first physical data 228, which is provided to the module 234, the module 234 is now able, by comparing the first physical data 228 to the physical data included in the manufacturing specifications 238, to select the metal workpiece that can be produced, in particular optimally produced, by working the coils 222 using the cold rolling process. For example, the tolerance data with respect to the thickness of the strip to be used for this purpose could be relatively narrow in the manufacturing specifications 238 for a certain metal workpiece to be produced, and the finished material 222 could exactly satisfy this narrow tolerance data, so that the module 234 then in fact assigns the finished material 222 to this manufacturing specification 238. If, conversely, manufacturing specifications with narrower and broader tolerance ranges are provided, and the finished material 222 does not satisfy the narrower tolerance range, the module 234 could thereupon determine that the desired metal workpiece having the larger tolerance range is to be produced from the finished material 222.

Furthermore, the finished material 222 is analyzed by means of a sensor 224 on the side of the cold rolling mill 202. For example, second physical data of the finished material is collected when the coil is being unwound for the subsequent rolling operation and supplied to a module 240. The module 240 can be included in the memory 108 of the module 102 in the form of the instructions 110 and carries out a plausibility check to the effect whether or not, for example, the first physical data 228 and the second physical data 208 plausibly match, in a segment-specific manner. If a plausibility check of the first and second physical data is not possible, various steps may follow as a result. One option is to optimize, adapt or repair the sensors 224. It is furthermore possible to adapt the production process on the part of the hot rolling mill, so as to take material modifications of the intermediate products 220 or of the finished material 222 into consideration, which obviously occur after the first physical data that cannot be checked for plausibility has been collected.

Figure 3:
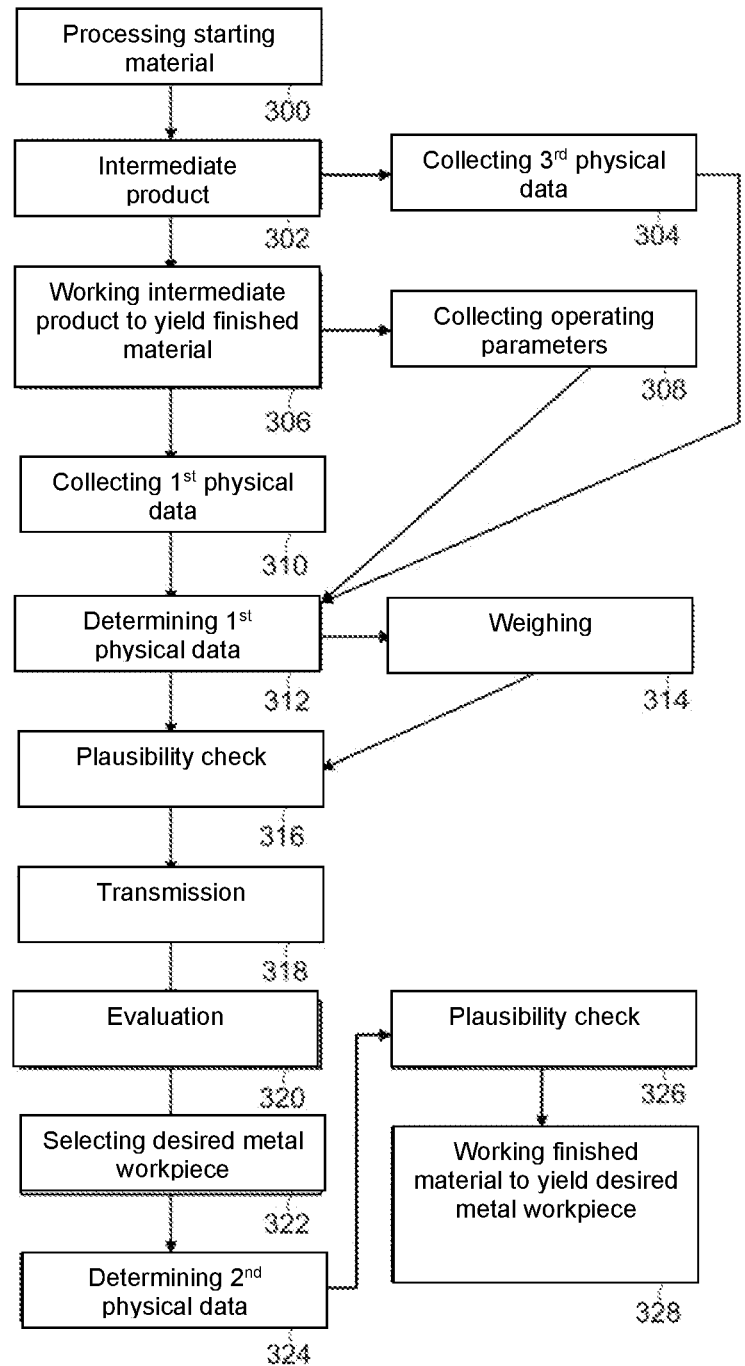
FIG. 3 shows a flow chart of a method for producing a desired metal workpiece.

FIG. 3 shows a flow chart of a method for producing a desired metal workpiece, wherein FIG. 2 shall be addressed again here for the purpose of the explanation. The method starts in step 300 by processing the starting material, wherein a corresponding intermediate product results here in step 302 from each processing step. This is one of the intermediate products 220. Optionally, it is possible to carry out a collection of third physical data, which takes place in step 304, with respect to each of the intermediate products.

The intermediate product produced in step 302 is further processed in step 306 to ultimately obtain the finished material therefrom. The operating parameters of the hot rolling mill used when working the intermediate product to yield the finished material can be collected in the optional step 308. In principle, it is possible to collect the third physical data and the operating parameters in a segment-specific manner in each processing step. After step 306, a portion of the first physical data of the finished material is collected, for example, in step 310, wherein the finished material can be scanned and measured here. However, it is also possible that the first physical data of the finished material was already completely collected or determined prior to step 306, for example determined from the third physical data collected in step 304, for example by calculation or adopting the data unchanged.

In step 312, the first physical data is determined, which can, for example, encompass gathering the first physical data collected in step 310 and calculating further first physical data from the third physical data (from step 304). In addition, the first physical data collected in step 310 can be supplemented by the operating parameters collected in step 308. It is possible, for example, to calculate the first physical data from the third physical data by taking a change in geometry of the intermediate product from step 302, which results from the processing step 306, into consideration in a segment-specific manner.

In the example of FIG. 3, an optional weighing operation of the finished material takes place in step 314, wherein thereupon a plausibility check can be carried out in step 316, based on the first physical data and the total weight, as to whether the generated finished material can in fact correspond, in terms of weight, to the finished material that was produced by the preceding processing steps.

The first physical data is thereupon evaluated in the form of a data record of, for example, a successful plausibility check in step 318, provided to the cold rolling mill by transmission, and evaluated by the cold rolling mill in step 320. In the optional step 322, the cold rolling mill can evaluate a desired metal workpiece, specifically for the received first physical data and the associated finished material, based on manufacturing specifications, which can be produced in an optimal manner, for example in an energy-efficient or time-efficient or material-efficient manner, or a combination thereof, from the finished material. It is also possible that, optionally, the cold rolling mill in step 324 determines second physical data of the received finished material, so as to establish as part of a plausibility check in step 326 (carried out by the cold rolling mill or hot rolling mill) whether or not the first physical data in fact matches the second physical data. If everything is plausible within certain tolerance settings, it is finally possible in step 328 for the cold rolling mill to process the finished material, to yield the desired metal workpiece.

As a result, instead of providing only discrete process values for each coil (for example, an average thickness of a coil) with respect to a coil, it is now proposed to provide continuous values (for example a strip thickness of a coil within the scope of 1-meter segments) across the entire strip length, together with the coil. The process of preparing the coil data, conducting the plausibility check, and transferring the data to the cold rolling mill provides added value, for example based on the physical data thus provided, so as to activate the production apparatuses of the hot and cold rolling mills even more effectively, increase the production output, and further enhance the product quality. The physical data can, for example, be incorporated in the control algorithms of the manufacturing apparatus of the cold rolling mill as direct input signals.

The digital image of a coil also impacts the scheduling of the customer's production planning and control. For example, the cold rolling mill can identify in advance, based on the thickness information of a coil, as to whether or not this "primary material" fits the intended purpose of the customer.

The targeted return of data in the form of the second physical data into, for example, the quality management system of the hot rolling mill enables a plausibility check and improvement of the measuring systems there, and an optimization of the product quality in the hot rolling mill within the scope of data-driven feedback.

Preferably, all manufacturing steps that are carried out in the manufacturing stations 204, such as rolling, pickling, annealing and the like, are continuously stored as third physical data, and scaled by the program to the final dimensions of the finished material 222 (for example compression, stretching). In the process, strip shortening and directional changes of the strip flow in each manufacturing step are also taken into consideration, for example derived from the ERP system, which controls the processes at the individual stations 204, for example by mirroring the measurement values from the strip start and the strip end.

The coil data per running meter is analyzed from the continuous original data and stored as a mean value, minimum value and maximum value, for example. Likewise, it is possible to ascertain and store the number of measurement values as well as the standard deviations of each segment. The, in particular centrally available, data can subsequently be automatically checked for integrity by way of plausibility checks (see module 240, which can also operate with respect to the first physical data 228 and a corresponding shipping weight), for example by converting the shipping weight for the measurement data length into meters. As a result of feeding back the second physical data, for example during the coil input measurement when entering cold rolling stations, the measuring systems in the hot rolling mill can undergo a plausibility check, and the product quality can thereby be optimized.

The cold rolling mill is able to view and analyze the transmitted first physical data at an early stage prior to the use in the production apparatuses. Corresponding scheduling-related actions regarding the assignment of a primary material coil (as finished material) to corresponding manufacturing specifications for corresponding manufacturing orders, for example based on the intended purpose of the customer, are likewise possible. The cold rolling mill can likewise adapt the utilization of the stations based on the actual values of the primary material, and set the manufacturing steps already before the strip enters, by using intelligent station controllers. For example, the cold rolling mill can carry out adaptations sooner and more effectively at the challenging strip sections, such as the rolling speed, and run the remaining strip sections at maximum speed. This proactive optimization of the strip speeds results in enhanced manufacturing quality and an increase in the machine productivity at the customers facility. The influence of the strip speeds was also described in FIG. 2 by way of the rolling parameters 236.

In another example, it is possible that the gathered third physical data 226 is condensed in the hot rolling and pickling process per measured variable (for example width, thickness) to meter segments and stored as a mean value, minimum value and maximum value, standard deviations, mean measurement value number. The manufacturing steps that are actually carried out, such as rolling, pickling, annealing and the like, are called up from a corresponding control system of the hot rolling mill, and the coil data is accordingly scaled. Thereafter, the aforementioned plausibility check of the coil length is carried out by way of the shipping weight, so that in this way the correct coil length to be sent to the customer is ensured. After a successful plausibility check, the data is provided together with the coil to the processing plant, for example the cold rolling mill.

LIST OF REFERENCE NUMERALS

100 hot rolling mill
102 module
104 processor
106 interface
108 memory
110 instructions
112 data record
114 physical data
116 coil
118 segment
120 longitudinal direction
122 module
124 processor
126 interface
128 memory
130 instructions
134 metal workpiece
200 hot rolling mill
202 cold rolling mill
204 station
206 slab casting
216 packaging unit 218 slab
220 intermediate product
222 finished material
224 sensor
226 third physical data
228 first physical data
230 calculation module
232 operating parameter
234 evaluation module
236 rolling parameter
238 manufacturing specifications
240 plausibility check module
244 station

The invention claimed is:

1. A method for producing a desired metal workpiece (134), the method comprising:
producing an elongate finished material (116; 222) by hot rolling, wherein a first data record (112) is assigned to the finished material (116; 222), wherein the finished material (116; 222) is logically divided in the longitudinal direction thereof into a plurality of first segments (118), wherein the first data record, for each of the first segments (118), includes first physical data (228) characterizing the segment;
working the finished material (116; 222) using a processing process to obtain the desired metal workpiece (134), wherein the processing process is at least partially controlled based on the first physical data (228) characterizing the first segments (118) that are logically assigned to the finished material (116:222), wherein
working the finished material (116; 222) comprises collecting second physical data (208) of those first segments (118) which are logically assigned to the finished material (116; 222) to be worked; and
the first physical data (228) is checked for plausibility using the second physical data (208),
based on the plausibility check (240) measuring systems (224) being optimized, by which at least one of the first and second physical data (208) was collected, or based on the plausibility check (240) the working of further finished material (116; 222) to be produced by hot rolling being adapted or halted.

2. The method according to claim 1, wherein a set of manufacturing specifications (238) is provided, each of the manufacturing specifications (238) comprising first physical data (228) of metal workpieces to be produced by the processing process, the control of the processing process comprising:
evaluating, by comparing the first physical data (228) included in the first data record to the first physical data included in the manufacturing specifications (238), which of the metal workpieces to be produced can be produced by processing the finished material (116; 222) using the processing process; and
selecting the desired metal workpiece (134) among the producible metal workpieces for working using the processing process.

3. The method according to claim 2, wherein the evaluation encompasses determining the portions of the finished material (116; 222) of which the metal workpieces to be produced can be produced, working the finished material (116; 222) encompassing working the portion of the finished material (116; 222) which was determined with respect to the desired metal workpiece (134).

4. The method according to claim 1, wherein the control of the processing process comprises specifically establishing at least one of physical bending parameters and stamping parameters and rolling parameters (236) based on the first data record so as to obtain the desired metal workpiece (134), wherein at least one of:
the specific establishment of at least one of the physical bending parameters and stamping parameters and rolling parameters (236) is carried out based on the first physical data (228) of those first segments (118) which are logically assigned to the portion of the finished material (116; 222) to be worked; and
the physical rolling parameters (236) comprise: at least one of the rolling speed, rolling thickness, intermediate annealing temperature and temper rolling parameters.

5. The method according to claim 1, furthermore comprising:
comparing the real weight of the finished material (116; 222) to a theoretical weight, wherein the theoretical weight is calculated from the first physical data (228), and
in the event that the real weight deviates from the theoretical weight by more than a predefined tolerance value, outputting a signal via a user interface.

6. The method according to claim 1, wherein the production of the finished material (116; 222) by hot rolling is carried out by way of multiple processing steps using consecutive manufacturing units (204), processing by the manufacturing units (204) in each case resulting in an elongate intermediate product (220), and processing by the last of the manufacturing units (204) resulting in the finished material (116; 222) as a intermediate product (220).

7. The method according to claim 6, wherein a second data record is assigned to a given intermediate product (220) of the intermediate products (220), the given intermediate product (220), in the longitudinal direction thereof, being logically divided into a plurality of second segments, the second data record for each of the second segments including third physical data (226) characterizing the segment, processing the given intermediate product (220) to yield the finished material (116; 222) influencing the physical properties of the intermediate product (220) in a previously known manner, the first physical data (228) being calculated from the third physical data (226), and the calculation (230) taking the previously known influence into consideration.

8. The method according to claim 7, wherein the previously known influence encompasses at least one of a mechanical and geometric influence.

9. The method according to claim 7, wherein the geometry of the finished material (116; 222) differs from the geometry of the given intermediate product (220), the previously known influence encompassing the difference in geometry, the calculation (230) of the first physical data (228) from the third physical data (226) taking into consideration an assignment of the second segments, which results from the difference in geometry, to the first segments (118).

10. The method according to claim 9, wherein the method comprises conducting a plausibility check of the first physical data (228) using the third physical data (226) and the difference in geometry, in the event that a plausibility check is not possible a signal being output via a user interface.

11. The method according to claim 9, wherein the operating parameters (232) comprise at least one of:
a force, acting on the respective processed intermediate product (220) during at least one of processing, and a temperature
a processing speed and
a convexity of a roll used during processing by the manufacturing unit.

12. The method according to any claim 7, wherein a given intermediate product (220) of the intermediate products (220) is processed using operating parameters (232) of the manufacturing unit carrying out the processing, processing the given intermediate product (220) resulting in working of the intermediate product (220), in a manner that is assignable to the first segments (118), using the respective operating parameters, and the first physical data (228) encompassing the operating parameters (232) used during processing specifically for the first segments (118).

13. A method according to claim 1, wherein at least one of the first (228), second (208) and third physical data (226), based on a given segment, at least one of i) includes at least one of the following: an absolute value, a mean value, a minimum, a maximum, a standard deviation and ii) describes at least one following properties of the segment: mechanical properties, geometric properties.

14. A computer program product, including instructions executable by a processor for carrying out the method according to claim 1.

15. A system for producing a desired metal workpiece (134), the system being designed to:
produce an elongate finished material (116; 222) by hot rolling, wherein a first data record (112) is assigned to the finished material (116; 222), wherein the finished material, in the longitudinal direction thereof, is logically divided (116; 222) into a plurality of first segments (118), wherein the first data record (112), for each of the first segments (118), includes first physical data (228) characterizing the segment; and
work the finished material (116; 222) using a processing process to obtain the desired metal workpiece (134), wherein the processing process is at least partially controlled based on the first physical data (228) characterizing the first segments (118) that are logically assigned to the finished material (116; 222), wherein working the finished material (116; 222) comprises collecting second physical data (208) of those first segments (118) which are logically assigned to the finished material (116; 222) to be worked; and the first physical data (228) is checked for plausibility using the second physical data (208), based on the plausibility check (240) measuring systems (224) being optimized, by which at least one of the first and second physical data (208) was collected, or based on the plausibility check (240) the working of further finished material (116; 222) to be produced by hot rolling being adapted or halted.

16. A method for controlling a production apparatus (100) of a hot rolling mill, the method through the production apparatus (100) of the hot rolling mill comprising:
producing an elongate finished material (116; 222) by hot rolling, wherein a first data record (112) is assigned to the finished material (116; 222), wherein the finished material (116; 222), in the longitudinal direction thereof, is logically divided into a plurality of first segments (118), wherein the first data record (112), for each of the first segments (118), includes first physical data (228) characterizing the segment;
transmitting the first data record to a production apparatus of a processing plant for controlling the working of the finished material (116; 222) using a processing process based on the first physical data (228); and
comparing the real weight of the finished material (116; 222) to a theoretical weight, wherein the theoretical weight is calculated from the first physical data (228), and in the event that the real weight deviates from the theoretical weight by more than a predefined tolerance value, outputting a signal via a user interface.

17. A device (102) for controlling a production apparatus (100) of a hot rolling mill, the device comprising a processor (104) and a memory (108) including program instructions (110), the execution of the program instructions (110) controlling the production apparatus (100) of the hot rolling mill so as to
produce an elongate finished material (116; 222) by hot rolling, wherein a first data record (112) is assigned to the finished material (116; 222), wherein the finished material (116; 222), in the longitudinal direction thereof, is logically divided into a plurality of first segments (118), wherein the first data record (112), for each of the first segments (118), includes first physical data (228) characterizing the segment;
transmit the first data record to a production apparatus of a processing plant for controlling the working of the finished material (116; 222) using a processing process based on the first physical data (228); and
compare the real weight of the finished material (116; 222) to a theoretical weight, wherein the theoretical weight is calculated from the first physical data (228), and in the event that the real weight deviates from the theoretical weight by more than a predefined tolerance value, outputting a signal via a user interface.

18. A method for controlling a production apparatus (132) of a processing plant for producing a desired metal workpiece (134) from a finished material, the method through the production apparatus (132) of the processing plant comprising:
receiving a first data record (112), wherein the first data record is assigned to the finished material (116; 222), wherein the finished material (116; 222), in the longitudinal direction thereof, is logically divided into a plurality of first segments (118), wherein the first data record, for each of the first segment (118), includes first physical data (228) characterizing the segment; and
working the finished material (116; 222) using a processing process to obtain the desired metal workpiece (134), wherein the processing process is at least partially controlled based on the first physical data (228) characterizing the first segments (118) that are logically assigned to the finished material (116; 222), wherein working the finished material (116; 222) comprises collecting second physical data (208) of those first segments (118) which are logically assigned to the finished material (116; 222) to be worked; and the first physical data (228) is checked for plausibility using the second physical data (208), based on the plausibility check (240) measuring systems (224) being optimized, by which at least one of the first and second physical data (208) was collected, or based on the plausibility check (240) the working of further finished material (116; 222) to be produced by hot rolling being adapted or halted.

19. A device (122) for controlling a production apparatus (132) of a processing plant, the device comprising a processor (124) and a memory (128) including program instructions, the execution of the program instructions (130) controlling the production apparatus (132) of the processing plant so as to
receive a first data record (112), wherein the first data record is assigned to the finished material (116; 222), wherein the finished material (116; 222), in the longitudinal direction thereof, is logically divided into a plurality of first segments (118), wherein the first data record, for each of the first segment (118), includes first physical data (228) characterizing the segment; and work the finished material (116; 222) using a processing process to obtain the desired metal workpiece (134), wherein the processing process is at least partially controlled based on the first physical data (228) characterizing the first segments (118) that are logically assigned to the finished material (116; 222) wherein working the finished material (116; 222) comprises collecting second physical data (208) of those first segments (118) which are logically assigned to the finished material (116; 222) to be worked; and the first physical data (228) is checked for plausibility using the second physical data (208), based on the plausibility check (240) measuring systems (224) being optimized, by which at least one of the first and second physical data (208) was collected, or based on the plausibility check (240) the working of further finished material (116:222) to be produced by hot rolling being adapted or halted.

\* \* \* \* \*